(12) United States Patent
Ohata et al.

(10) Patent No.: US 8,989,604 B2
(45) Date of Patent: Mar. 24, 2015

(54) OPTICAL RECEIVER

(75) Inventors: Nobuo Ohata, Chiyoda-ku (JP); Mizuki Shirao, Chiyoda-ku (JP); Keita Mochizuki, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 12 days.

(21) Appl. No.: 13/611,979

(22) Filed: Sep. 12, 2012

(65) Prior Publication Data
US 2013/0302042 A1 Nov. 14, 2013

(30) Foreign Application Priority Data
May 14, 2012 (JP) ................................ 2012-110434

(51) Int. Cl.
| | | |
|---|---|---|
| H04B 10/06 | (2006.01) | |
| G02B 6/42 | (2006.01) | |
| H04B 10/67 | (2013.01) | |
| G02B 6/293 | (2006.01) | |
| G02B 6/32 | (2006.01) | |

(52) U.S. Cl.
CPC .............. *G02B 6/4214* (2013.01); *H04B 10/67* (2013.01); *G02B 6/29398* (2013.01); *G02B 6/32* (2013.01); *G02B 6/4215* (2013.01)
USPC ........................................ 398/212; 398/202

(58) Field of Classification Search
USPC ................................................. 398/202, 212
See application file for complete search history.

(56) References Cited

U.S. PATENT DOCUMENTS

| | | | |
|---|---|---|---|
| 5,491,587 A | | 2/1996 | Iwaki et al. |
| 5,793,912 A | * | 8/1998 | Boord et al. ..................... 385/37 |
| 6,070,982 A | * | 6/2000 | Aritake .......................... 353/20 |
| 7,164,859 B2 | * | 1/2007 | Belser et al. .................... 398/49 |
| 2005/0013021 A1 | * | 1/2005 | Takahashi et al. ............. 359/837 |
| 2007/0002450 A1 | | 1/2007 | Watanabe et al. |
| 2009/0016678 A1 | * | 1/2009 | Kawamura et al. ............. 385/33 |
| 2010/0116973 A1 | | 5/2010 | Maetaki |
| 2010/0290128 A1 | * | 11/2010 | Sugitatsu ...................... 359/634 |
| 2011/0280514 A1 | | 11/2011 | Omura et al. |

FOREIGN PATENT DOCUMENTS

| | | |
|---|---|---|
| CN | 1510449 A | 7/2004 |
| CN | 1729416 A | 2/2006 |

(Continued)

OTHER PUBLICATIONS

U.S. Appl. No. 13/609,664, filed Sep. 11, 2012, Ohata.

(Continued)

*Primary Examiner* — David Payne
*Assistant Examiner* — Casey Kretzer
(74) *Attorney, Agent, or Firm* — Oblon, McClelland, Maier & Neustadt, L.L.P.

(57) ABSTRACT

An optical receiver is provided with a photoelectric converter that outputs an electrical signal according to light that is received by a light-receiving region. The optical receiver is provided with a condensing lens and optical filter that are located in an optical path from where signal light enters towards the light-receiving region. The condensing lens condenses the signal light onto the light-receiving region. The optical filter reflects light having a first wavelength that is included in the signal light using a front surface thereof and reflects light having a second wavelength that is included in the signal light using a rear surface thereof that faces the front surface so that the light is emitted through the front surface.

9 Claims, 6 Drawing Sheets

(56) References Cited

FOREIGN PATENT DOCUMENTS

| | | |
|---|---|---|
| CN | 101344625 A | 1/2009 |
| CN | 101592785 A | 12/2009 |
| CN | 101937118 A | 1/2011 |
| JP | 63-39151 | 2/1988 |
| JP | 5-34642 | 2/1993 |
| JP | 2010-117472 | 5/2010 |
| JP | 2011-154390 | 8/2011 |
| WO | WO 2005/076049 A1 | 8/2005 |

OTHER PUBLICATIONS

Chinese Office Action issued Oct. 24, 2014 in Chinese Patent Application No. 201210362518.0 (with partial English translation).

* cited by examiner

OPTICAL RECEIVER

CROSS-REFERENCE TO RELATED APPLICATION

This application claims the benefit of Japanese Patent Application No. 2012-110434, filed on May 14, 2012, the entire disclosure of which is incorporated by reference herein.

FIELD

This application relates to an optical receiver.

BACKGROUND

An optical communication system is a system for transmitting and receiving optical signals by way of optical fiber, and an optical receiver is one component of an optical communication system. In an optical receiver, typically signal light that enters into the optical receiver by way of optic fiber is condensed and collected in a photoelectric converter by way of a lens or the like, and converted to an electric signal by the photoelectric converter. The electric signal that is obtained by converting the incoming light undergoes processing such as amplification and/or the like, and then outputted from the optical receiver.

The wavelength of signal light that is used in an optical communication system is set according to standards. For example, in ITU-T (International Telecommunication Union Telecommunication Standardization Sector) G.693, the use of light having wavelengths of 1.31 um (micrometers) and 1.55 um is regulated for short-range high-speed signal transmission.

When light having different wavelengths is used for optical communication, the optical receiver preferably receives light of any wavelength with good sensitivity. However, the index of refraction for lenses made using typical glass material differs for each wavelength, so that when light having different wavelengths passes through a lens, chromatic aberration occurs. When the coupling efficiency between optical fiber and a photoelectric converter for light having a certain wavelength is improved in a state in which chromatic aberration has occurred, the coupling efficiency of light of other wavelengths decreases. In a state such as this wherein chromatic aberration has occurred, the coupling efficiency depends on the wavelength of light, so that the sensitivity of the optical receiver also depends on the wavelength of light.

Various technologies have been proposed for correcting chromatic aberration in order to make the coupling efficiency the same for light of all wavelengths and to improve the sensitivity for light of all wavelengths. For example, Unexamined Japanese Patent Application Kokai Publication No. H5-34642 discloses technology for correcting chromatic aberration by combining a convex lens and a concave lens.

However, in the technology disclosed in Unexamined Japanese Patent Application Kokai Publication No. H5-34642, a plurality of lenses is combined, resulting in a problem in that the construction of the optical receiver becomes complex. Moreover, in constructing an optical receiver by combining a plurality of lenses, there is a problem in that much work is required in order to perform optical-axis alignment of the lenses.

Taking the situation above into consideration, it is the objective of the present invention to provide an optical receiver having simple construction that is capable of correcting chromatic aberration.

SUMMARY

In order to accomplish the object above, the optical receiver of the present invention is provided with:

a photoelectric converter that outputs an electrical signal according to light received by a light-receiving region;

a condensing lens that is located in an optical path from where signal light enters towards the light-receiving region, and that condenses the signal light onto the light-receiving region; and an optical filter that is located in the optical path from where the signal light enters towards the light-receiving region, and that reflects light having a first wavelength that is included in the signal light using a front surface thereof and reflects light having a second wavelength that is included in the signal light using a rear surface thereof that faces the front surface so that the light is emitted through the front surface.

With the present invention, the optical filter that reflects light having a first wavelength that is included in the signal light using a front surface thereof, and reflects light having a second wavelength that is included in the signal light using a rear surface thereof so that emits that light from the front surface is located in the optical path from where the signal light enters the optical receiver towards where the signal light reaches the photoelectric converter. As a result, chromatic aberration that occurs by light having different wavelengths included in the signal light passing through a lens can be corrected. Therefore, it is possible to correct chromatic aberration with simple construction.

BRIEF DESCRIPTION OF THE DRAWINGS

A more complete understanding of this application can be obtained when the following detailed description is considered in conjunction with the following drawings, in which.

DETAILED DESCRIPTION

Figure 1:
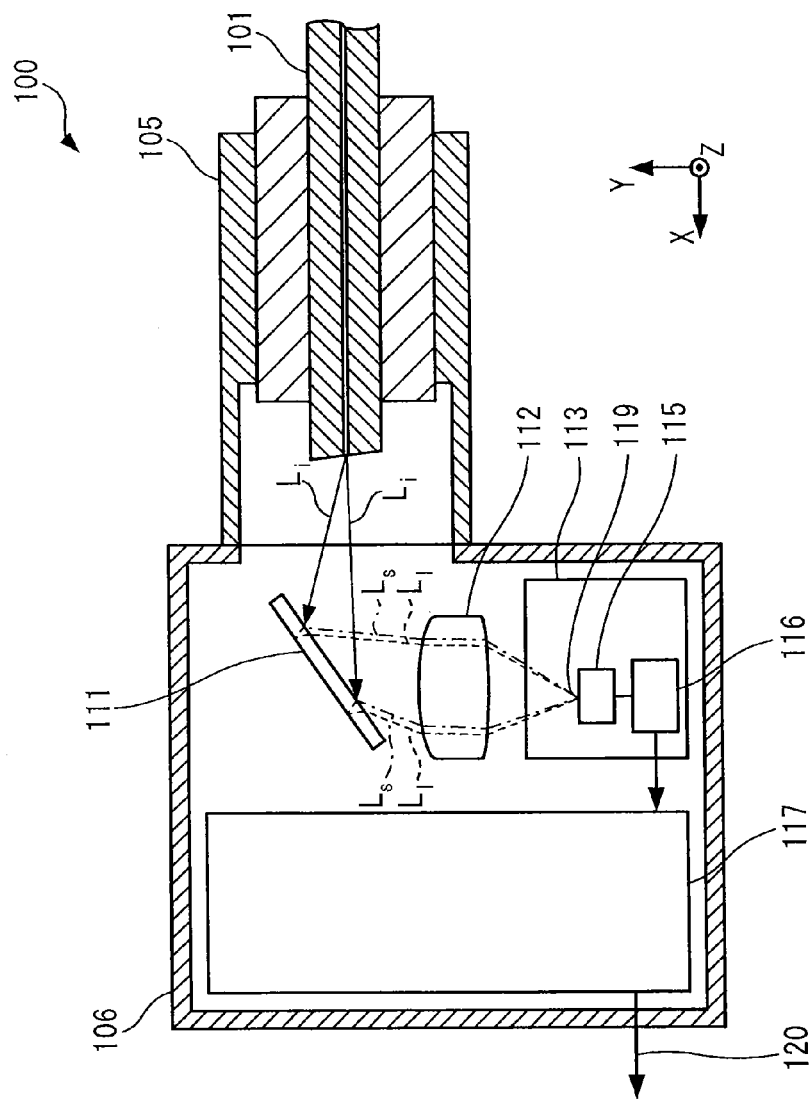
FIG. 1 is a cross-sectional drawing illustrating an optical receiver of a first embodiment of the present invention.

In the following, embodiments of the present invention will be explained with reference to the drawings. In the drawings, the same reference numbers will be used for elements that are the same. Redundant explanations of elements that are the same will be omitted.

In the explanation below, the X-axis direction, the Y-axis direction and Z-axis direction in figures will be used. More specifically, in FIG. 1 and FIGS. 3 to 6, for example, as illustrated in each drawing, the direction from right to left when facing the drawing is taken to be the positive X direction, and the opposite direction is taken to be the negative X direction; the direction from bottom to top when facing the drawing is taken to be the positive Y direction, and the opposite direction is taken to be the negative Y direction; and the direction from rear to front of the drawing is taken to be the positive Z direction, and the opposite direction is taken to be the negative Z direction. These directions are used for explanation purposes and do not limit the invention.

Embodiment 1

The optical receiver 100 of a first embodiment of the present invention is a device that receives signal light by way of an optical fiber 101 and outputs an electrical signal according to the received signal light; and as illustrated in FIG. 1, is provided with an optical fiber holder 105 and main body 106.

The optical fiber holder 105 is a cylindrical member whose center axis extends in the X-axis direction, and, for example, is made of metal. Optical fiber 101 is inserted into the optical fiber holder 105 through the end section on the negative X direction side. As a result, an optical signal that is propagated by way of the optical fiber 101 enters from the end section of the optical fiber 101 into the optical receiver 100 as incoming light $L_i$.

The end section on the negative X direction side of the optical fiber holder 105 and the optical fiber 101 fit together so that light is not leaked to the outside from the end section. The end section on the positive X direction side of the optical fiber holder 105 is connected to the main body 106 so that light is not leaked to the outside.

The main body 106 is a hollow, box shaped member, and, for example, is a metal rectangular body. As described above, the optical fiber holder 105 is connected to one surface of the main body 106, and internal space of the main body 106 and the optical fiber holder 105 is connected.

As illustrated in FIG. 1, the main body 106 is provided with an optical filter 111, a condensing lens 112, a photoelectric converter 115 and amplifier 116 that are supported by a carrier 113, and a circuit board 117.

The optical filter 111 is a flat wavelength separating filter that is fastened to the main body 106 by a support member that is not illustrated in the figure. The front surface of the optical filter 111 reflects light having a first wavelength of 1.31 um (micrometers) (short-wavelength light) $L_s$, and the rear surface that faces the front surface reflects light having a second wavelength of 1.55 um (long-wavelength light) $L_l$, and emits that light through the front surface.

The optical filter 111 is located in the positive X direction with respect to the optical fiber 101. This optical filter 111 is provided so as to separate short-wavelength light $L_s$ and long-wavelength light $L_l$ that are parts of the incoming light $L_i$ that is emitted from the optical fiber 101, and then reflect light towards the condensing lens 112 that will be described later.

The condensing lens 112 is a single convex lens that is fastened to the main body 106 by a support member that is not illustrated in the figure. The condensing lens 112, for example, is placed in the negative Y direction with respect to the optical filter 111. The optical magnification of the condensing lens 112 can be appropriately set; however, preferably, the optical magnification M on the negative Y direction side as seen from the positive Y direction side is less than 1.

The photoelectric converter 115 is provided with, for example, a waveguide type photodiode, and after receiving light by its own light-receiving region 119, outputs an electrical signal according to that light. The photoelectric converter 115 is located in the negative Y direction with respect to the condensing lens 112, and the light-receiving region 119 is arranged so as to face towards the positive Y direction. The photoelectric converter 115 can also be a light-receiving surface type.

The amplifier 116 is provided with, for example, a transistor, and amplifies the electrical signal that is outputted from the photoelectric converter 115.

The circuit board 117 is a circuit board containing electrical circuits that are provided as appropriate; for example, is provided with an electrical circuit that performs conversion or the like for outputting the electrical signals that are outputted from the amplifier 116 according to predetermined specifications. The amplifier 116 is connected to the circuit board 117 by way of gold wire or the like, and an output terminal 120 that outputs electrical signals to the outside of the optical receiver 100 is connected to the circuit board 117. The circuit board can be one circuit board, or can be a plurality of circuit boards that are connected by gold wire or the like. Moreover, the output terminal 120 can be provided with one or a plurality of lines and/or the like.

Up to this point, the construction of the optical receiver 100 of this embodiment has been explained. In the following, the operation of the optical receiver 100 will be explained.

Signal light is transmitted by optical fiber 101, and after being emitted from the end section of the optical fiber 101, enters into the optical receiver 100 as incoming light $L_i$. The incoming light $L_i$, for example, includes short-wavelength light $L_s$ having a wavelength of 1.31 um, and long-wavelength light $L_l$ having a wavelength of 1.55 um.

The incoming light $L_i$ is irradiated onto the optical filter 111. The front surface of the optical filter 111 reflects the short-wavelength light $L_s$. The long-wavelength light $L_l$ passes through the front surface of the optical filter 111, is reflected using the rear surface and then emitted through the front surface. The short-wavelength light $L_s$ and long-wavelength light $L_l$ that are separated and reflected by the optical filter 111 pass through the condensing lens 112 and are condensed in a range that is the same or narrower than the light-receiving region 119. In this way, the light-receiving region 119 is optically coupled with the end section of the optical fiber 101 by way the optical filter 111 and the condensing lens 112, in that order.

The photoelectric converter 115, by performing photoelectric conversion, outputs an electrical signal according to the light that is received from the condensing lens 112. The amplifier 116 amplifies the electrical signal that is outputted from the photoelectric converter 115. The electrical signal that is amplified by the amplifier 116 is appropriately converted to a specified electrical signal by the circuit board 117 and outputted from the optical receiver 100. In this way, in this embodiment, the optical filter 111 is located in the optical path from where the incoming light $L_i$ enters into the optical receiver 100 towards the condensing lens 112. The optical filter 111 reflects light $L_s$ having a short wavelength of 1.31 um using the front surface thereof, and reflects light $L_l$ having a long wavelength of 1.55 um using the rear surface thereof.

In a condensing lens 112 that uses typical glass material, the index of refraction of long-wavelength light $L_l$ is less than that of short-wavelength light $L_s$, so that when incoming light $L_i$ directly passes through the condensing lens 112, chromatic aberration occurs. In this embodiment, the incoming light $L_i$ passes through the condensing lens 112 by way of the optical filter 111 as described above, so that the optical path length of the long-wavelength light $L_l$ can be adjusted by the optical filter 111.

As a result, it is possible to correct the chromatic aberration that occurs by light passing through the condensing lens 112. Therefore, it is possible to easily correct chromatic aberration without the optical receiver 100 having to have complex construction such as having a combination of a plurality of lenses.

In the case of using a combination of a plurality of lenses in order to correct chromatic aberration, when the lenses themselves are expensive, the optical receiver 100 becomes expensive. Moreover, in order to combine a plurality of lenses, work is required during assembly of the optical receiver 100 such as alignment of the optical axis, and this as well causes the optical receiver 100 to become more expensive. With this embodiment, chromatic aberration can be corrected by utilizing an optical filter 111, so that it is possible to provide an inexpensive optical receiver 100.

Furthermore, by correcting chromatic aberration, it is possible to obtain coupling efficiency between the optical fiber 101 and the light-receiving region 119 that does not depend on the wavelength of light. For example, the result of calculating the relationship between the coupling efficiency and the wavelength of light, in the case where chromatic aberration is not corrected and the light $L_s$ having a short-wavelength of 1.31 um is adjusted so that the coupling efficiency is optimized, is as illustrated by the dotted line 122 in FIG. 2. In this case, it can be seen that the coupling efficiency for light of wavelengths other than the wavelength 1.31 um becomes low.

Figure 2:
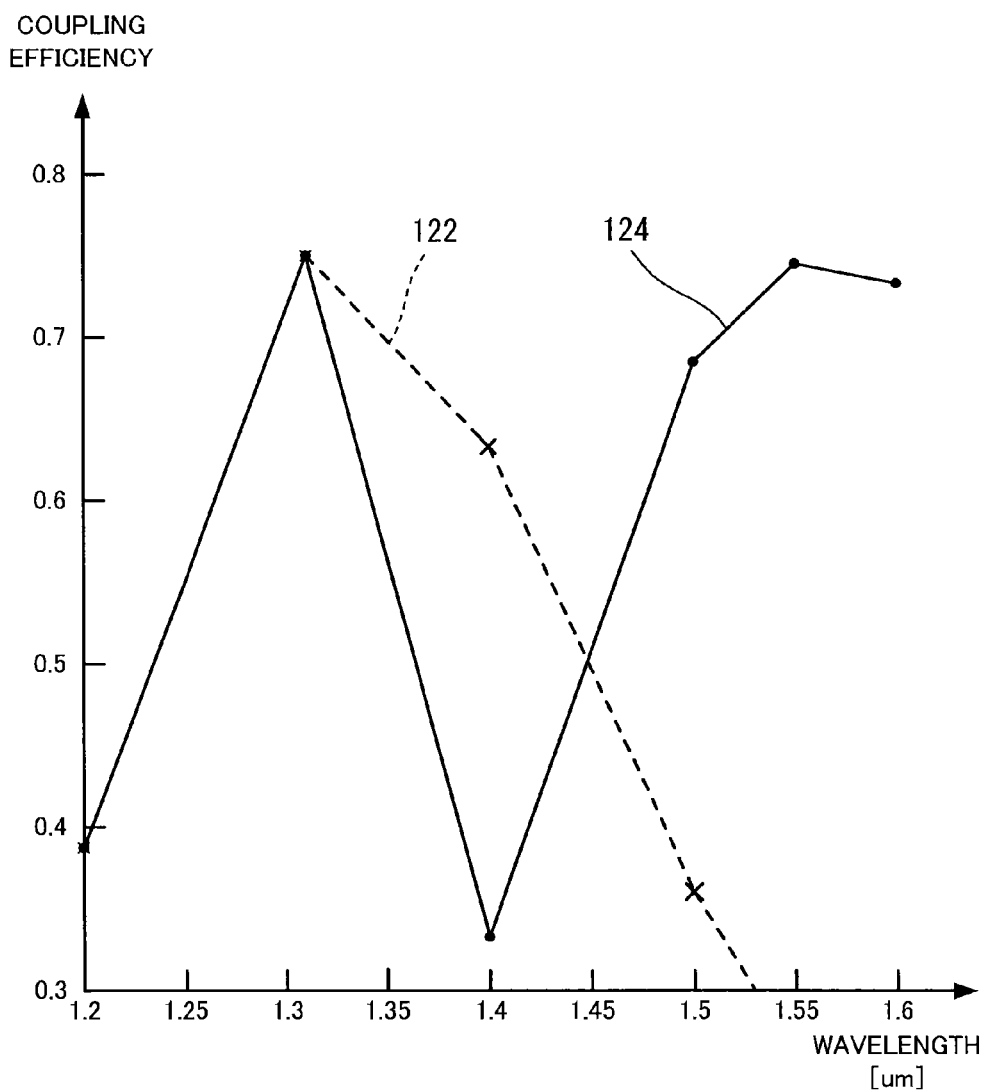
FIG. 2 is a graph illustrating an example of the relationship of the coupling efficiency between the end section of an optical fiber and the light-receiving region of a photoelectric converter, and the wavelength of light.

On the other hand, the result of calculating the relationship between the coupling efficiency and the wavelength of light, in the case where chromatic aberration is corrected by using an optical filter 111, is as illustrated by solid line 124 in FIG. 2. In this calculation, calculation was performed assuming that the thickness of the substrate of the optical filter 111 was 0.15 mm, and that 50% of the light having a wavelength of 1.4 um is reflected by the optical filter. It can be seen that by correcting the chromatic aberration by using the optical filter 111, the coupling efficiency of both the long-wavelength light $L_1$ having a wavelength of 1.55 um and the short-wavelength light $L_s$ having a wavelength of 1.31 um is about the same.

In this way, by correcting the chromatic aberration, it becomes possible to obtain coupling efficiency that does not depend on the wavelength of light. Therefore, with this embodiment, it is possible to easily achieve an optical receiver 100 that has good sensitivity and that does not depend on the wavelength of light.

Furthermore, by making the coupling efficiency about the same for light having different wavelengths, an optical receiver 100 can be achieved that has high sensitivity to high-speed signals. Typically, when trying to achieve an optical receiver 100 having high sensitivity to high-speed signals, it is necessary to widen the bandwidth of the pass band for high-frequency signals in the photoelectric converter 115. When widening the bandwidth of the pass band for high-frequency signals while at the same time maintaining high sensitivity of the photoelectric converter 115, a waveguide type of photoelectric converter 115 is more suitable than a light-receiving surface type of photoelectric converter 115. In a light-receiving surface type of photoelectric converter 115, the incoming direction of the light and the direction of the carrier are the same, so that the sensitivity for receiving light and the pass band for high-frequency signals are set according to the thickness of the absorbing layer included therein; however, in a waveguide type of photoelectric converter 115, the incoming direction of light and the direction of the carrier differ, so that by adjusting the thickness and length of the absorbing layer, it is possible to independently design the sensitivity for receiving light and the pass band for high-frequency signals.

Even in the case of a light-receiving surface type of photoelectric converter 115, obtaining high coupling efficiency regardless of the wavelength is advantageous. In the case of a light-receiving surface type of photoelectric converter 115, high sensitivity for receiving light is obtained by light entering the light-receiving region, so that the size of the spot of light that is formed on the light-receiving region should be smaller than the light-receiving region. However, in the case of a waveguide type of photoelectric converter 115, in order to achieve high sensitivity for receiving light, it is necessary to focus the light into the waveguide, resulting in that, in addition to making the size of the spot of light the same size as the light-receiving region 119, it is necessary to align the phase of the light.

In this embodiment, it is possible to obtain a coupling efficiency that does not depend on the wavelength of the light. As a result, it is possible to easily obtain an optical receiver 100 having high sensitivity to high-speed signals using a waveguide type of photoelectric converter 115.

Furthermore, in this embodiment, by making the optical magnification M on the negative Y direction side of the condensing lens 112 as seen from positive Y-direction side less than 1, it is possible to obtain coupling efficiency having stable long-wavelength light $L_l$. Typically, the amount of deviation Δb in the image formation position in the optical-axis direction with respect to the amount of deviation Δa of the object point distance in the optical direction is expressed as $\Delta a^2 \times M$. When the end section of the optical fiber 101 is considered to be the object point, and the light-receiving region 119 is considered to be the position of image formation, by making the optical magnification M on the negative Y direction side of the condensing lens 112 as seen from positive Y-direction side less than 1, the effect that the amount of deviation of the distance from the end section of the optical fiber 101 to the rear surface of the optical filter 111 has on the amount of deviation of the position of image formation is kept low. Therefore, it is possible to reduce the dispersion in the position of image formation that occurs because the thickness of the optical filter 111 is not uniform due to manufacturing error. In other words, it enables the obtainment of coupling efficiency having stable long-wavelength light $L_i$ regardless of where on the rear surface of the optical filter 111 the long-wavelength light $L_i$ is reflected.

Embodiment 2

Figure 3:
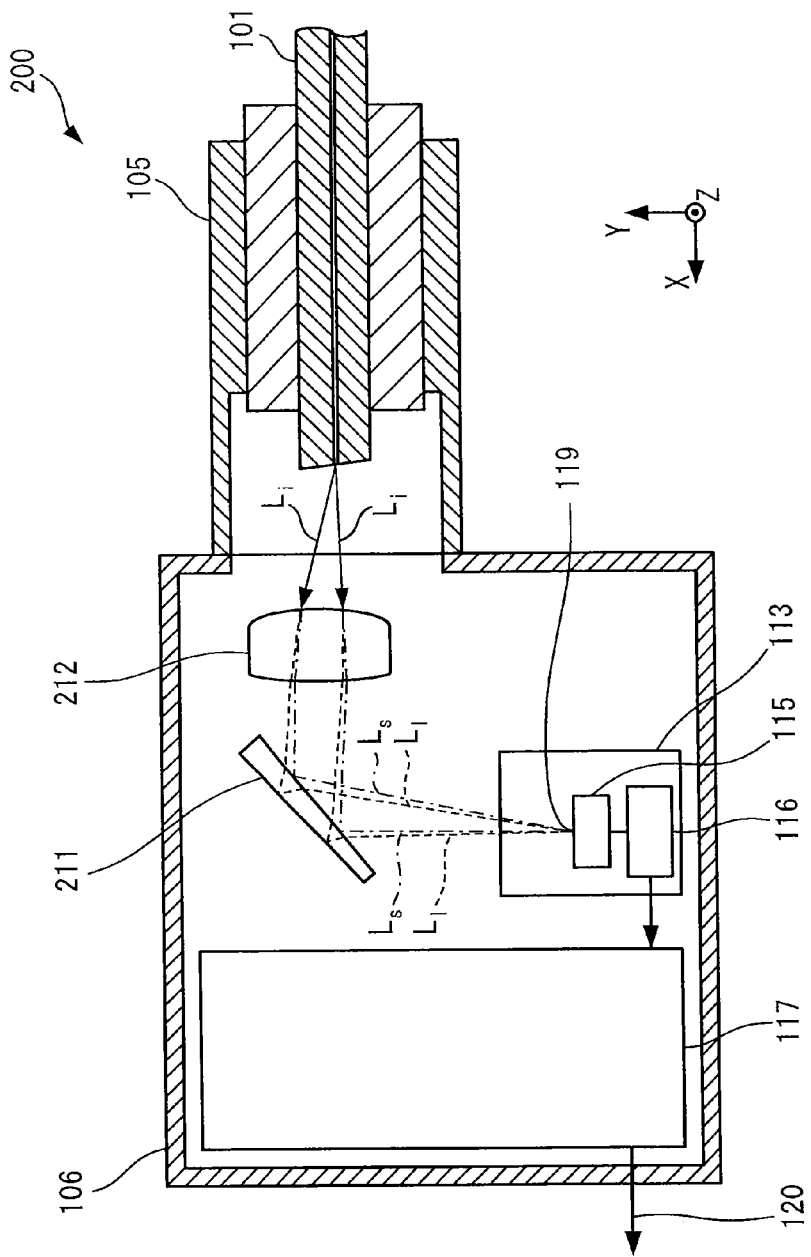
FIG. 3 is a cross-sectional drawing illustrating an optical receiver of a second embodiment of the present invention.

As illustrated in FIG. 3, the optical receiver 200 of this embodiment is provided with a construction basically similar to that of the optical receiver 100 of embodiment 1; however, the placement of the condensing lens 212 and the placement and shape of the optical filter 211 in the main body 106 differ from that of the optical receiver 100 of embodiment 1.

The condensing lens 212, similar to that of embodiment 1, is a single convex lens that is fastened to the main body 106 by a support member that is not illustrated in the figure. The condensing lens 212, for example, is placed in the positive X direction with respect to the optical fiber 101. Preferably, the optical magnification M on the positive X-direction side of the condensing lens 212 as seen from the negative X-direction side is less than 1.

The optical filter 211 is a wavelength separating filter that is fastened to the main body 106 by a supporting member that is not illustrated in the figure, and similar to the optical filter 111 of embodiment 1, the front surface of the optical filter 211 reflects short-wavelength light $L_s$, and the rear surface that faces the front surface reflects long-wavelength light $L_1$ and emits that light from the front surface. The optical filter 211 differs from the optical filter 111 of embodiment 1 in that the front surface and rear surface are not parallel as seen from the Z direction, but form a wedge shape.

The optical filter 211 is placed on the positive X-direction side with respect to the condensing lens 212, and on the positive Y-direction side with respect to the photoelectric converter 115. The optical filter 211 is provided so as to reflect short-wavelength light $L_s$ and long-wavelength light $L_l$ that passed through the condensing lens 212 towards the light-receiving region 119. The optical filter 211 is arranged such that the thickness gradually becomes thinner in the direction going away from the condensing lens 212 as seen from the Z direction.

Up to this point, the construction of the optical receiver 200 of this embodiment was explained. From this point on, the operation of the optical receiver 200 will be explained. Incoming light L that enters into the optical receiver 200 after being emitted from the end section of the optical fiber 101 is irradiated onto the condensing lens 212. As the incoming light $L_i$ passes through the condensing lens 212, chromatic aberration occurs, so that short-wavelength light $L_s$ and long-wavelength light $L_l$ are emitted from the condensing lens 212 by different optical paths.

Short-wavelength light $L_s$ and long-wavelength light $L_l$ that are emitted from the condensing lens 212 enter the optical filter 211. The short-wavelength light $L_s$ is reflected using the front surface of the optical filter 211. The long-wavelength light $L_l$ passes through the front surface of the optical filter 211 and is reflected using the rear surface thereof to be emitted through the front surface.

Short-wavelength light $L_s$ and long-wavelength light $L_l$ that are reflected by the optical filter 211 are condensed into an area that is the same or smaller than the light-receiving region 119. In this way, the light-receiving region 119 is optically coupled with the end section of the optical fiber 101 by way of the condensing lens 212 and the optical filter 211, in that order.

In this embodiment, after chromatic aberration has occurred by the light passing through the condensing lens 212, the short-wavelength light $L_s$ and long-wavelength light $L_l$ are condensed onto the light-receiving region 119 by way of the optical filter 211. The optical filter 211 has a wedge shape, and is located such that the thickness gradually becomes thinner in a direction going away from the condensing lens 212 as seen from the Z direction, enabling the condensation of the short-wavelength light $L_s$ and long-wavelength light $L_l$, for which chromatic aberration occurred, onto the light-receiving region 119. Therefore, it is possible for the optical filter 211 to correct the chromatic aberration that occurred due to the light passing through the condensing lens 212. As in the case of embodiment 1, it is possible to easily correct chromatic aberration, provide a inexpensive optical receiver 200, easily achieve an optical receiver 200 having good sensitivity that does not depend on the wavelength of light, and easily achieve an optical receiver 200 having high sensitivity for high-speed signals.

By making the optical filter 211 wedge shaped, it is possible to place the optical filter 211 at a later stage than the condensing lens 212 in the optical path from after incoming light $L_i$ enters the optical receiver 200 towards the photoelectric converter 115. As a result, it is possible to improve the flexibility of design, for example, it becomes possible to make the optical receiver 200 more compact.

Embodiment 3

Figure 4:
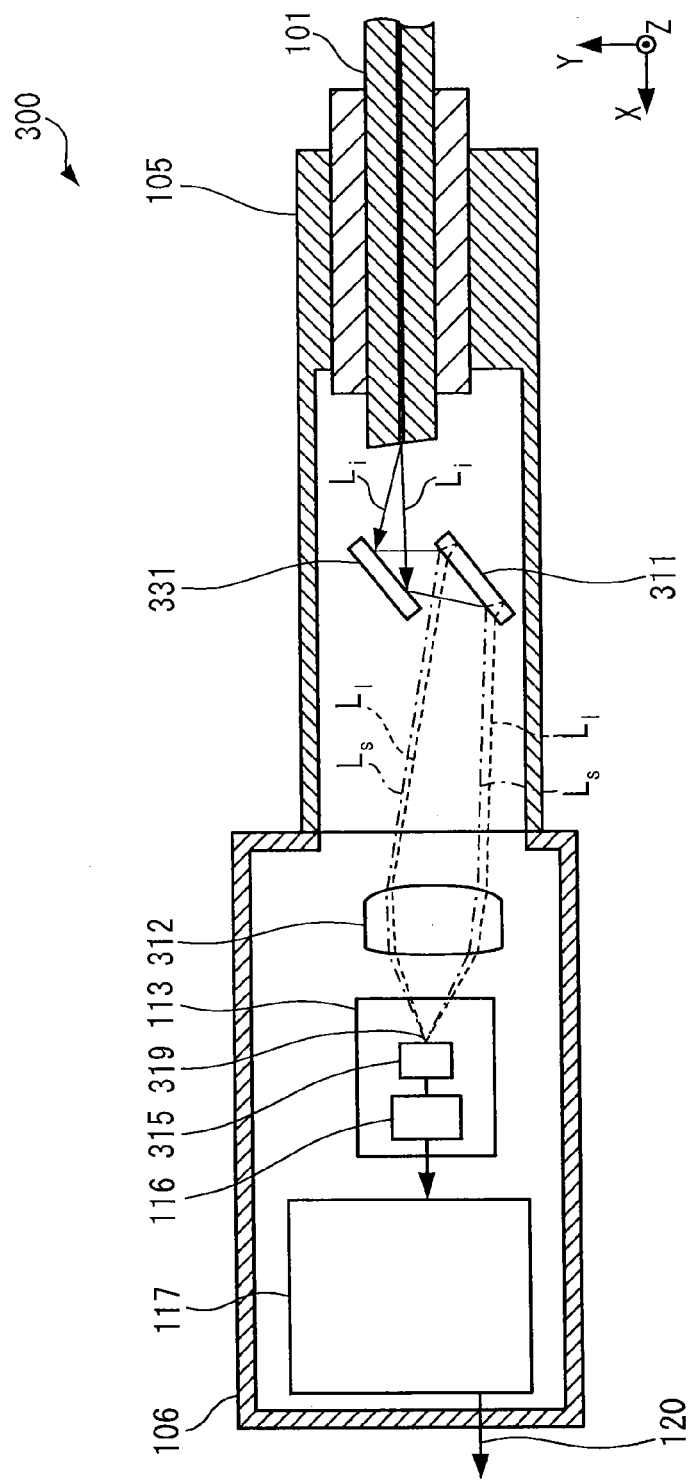
FIG. 4 is a cross-sectional drawing illustrating an optical receiver of a third embodiment of the present invention.

As illustrated in FIG. 4, the optical receiver 300 of this embodiment is provided with an optical fiber holder 105 and a main body 106 that are the same as in Embodiment 1, and an optical fiber 101 is inserted into the optical fiber holder 105 in the same way as in Embodiment 1.

The optical receiver 300 of this embodiment is provided with a mirror 331 and optical filter 311 inside the optical fiber holder 105. Moreover, the optical receiver 300 is provided inside the main body 106 with a condensing lens 312, a photoelectric converter 315 and amplifier 116 that are fastened by way of a carrier 113, and a circuit board 117.

The mirror 331 is a flat mirror that is fastened to the optical fiber holder 105 by a support member that is not illustrated in the figure. The mirror 331 is placed on the positive X-direction side with respect to the optical fiber 101 so that the incoming light $L_i$ that is emitted from the optical fiber 101 is reflected towards the optical filter 311 that will be described later.

The optical filter 311 is a flat plate shaped wavelength separating filter that is fastened to the optical fiber holder 105 by a support member that is not illustrated in the figure. The optical filter 311 is the same as the optical filter 111 in Embodiment 1 in that, short-wavelength light $L_s$ is reflected using the front surface and long-wavelength light $L_l$ is reflected using the rear surface to be emitted through the front surface.

The optical filter 311 is located on the negative Y direction side with respect to the mirror 331, and is located so as to be able to reflect the short-wavelength light $L_s$ and long-wavelength light $L_l$ that are included in the light reflected by the mirror 331 towards the condensing lens 312.

The condensing lens 312, as in Embodiment 1, is a single convex lens that is fastened to the main body 106 by a support member that is not illustrated in the figure. The condensing lens 312, for example, is located on the positive X direction side with respect to the optical folder 311. Preferably, the optical magnification M on the positive X direction side of the condensing lens 312 as seen from the negative X direction side is less than 1.

The photoelectric converter 315, as in the case of the photoelectric converter 115 of Embodiment 1, is provided with, for example, a waveguide type of photodiode, and after the light-receiving region 319 of the photoelectric converter 315 receives light, the photoelectric converter 315 outputs an electrical signal that corresponds to that light. The photoelectric converter 315 is located on the positive X-direction side with respect to the condensing lens 312, and the light-receiving region 319 is located towards the negative X-direction side. The photoelectric converter 315 may also be a light-receiving surface type as in Embodiment 1.

Up to this point, the construction of the optical receiver 300 of this embodiment was explained. From this point, the operation of the optical receiver 300 will be explained.

The incoming light $L_i$ that is emitted from the end section of the optical fiber 101 and enters into the optical receiver 300 is incident on the mirror 331 and reflected towards the optical filter 311.

The front surface of the optical filter 311 that received the reflected light from the mirror 331 reflects the short-wavelength light $L_s$. The long-wavelength light $L_l$ passes through the front surface of the optical filter 311, is reflected using the rear surface and emitted through the front surface. The short-wavelength light $L_s$ and long-wavelength light $L_l$ that are separated and reflected by the optical filter passes through the condensing lens 312, and are condensed on an area that is equal to or less than the size of the light-receiving region 319. In this way, the light-receiving region 319 is optically coupled with the end section of the optical fiber 101 by way of the mirror 331, optical filter 311 and condensing lens 312, in that order.

In this embodiment as well, the chromatic aberration that occurs by light passing through the condensing lens 312 is corrected by the optical filter 311. Therefore, as in Embodiment 1, it is possible to easily correct chromatic aberration, provide an inexpensive optical receiver 300, easily achieve an optical receiver 300 having good sensitivity that does not depend on the wavelength of light, and easily achieve an optical receiver 300 having high sensitivity to high-speed signals.

Moreover, by providing a mirror 331, it is possible to place the optical filter 311 inside the optical fiber holder 105. As a result, it is possible to improve flexibility of design, for example, the optical receiver 300 can be made more compact.

Furthermore, the optical magnification M on the positive X-direction side of the condensing lens 312 as seen from the negative X-direction side is less than 1. As a result, as in Embodiment 1, it is possible to reduce dispersion of the image formation position that occurs when the thickness of the optical filter 311 is not uniform due to manufacturing error. In other words, it is possible to obtain coupling efficiency with stable long-wavelength light $L_l$ regardless of where on the rear surface of the optical filter 311 that the long-wavelength light $L_l$ is reflected.

Embodiment 4

Figure 5:
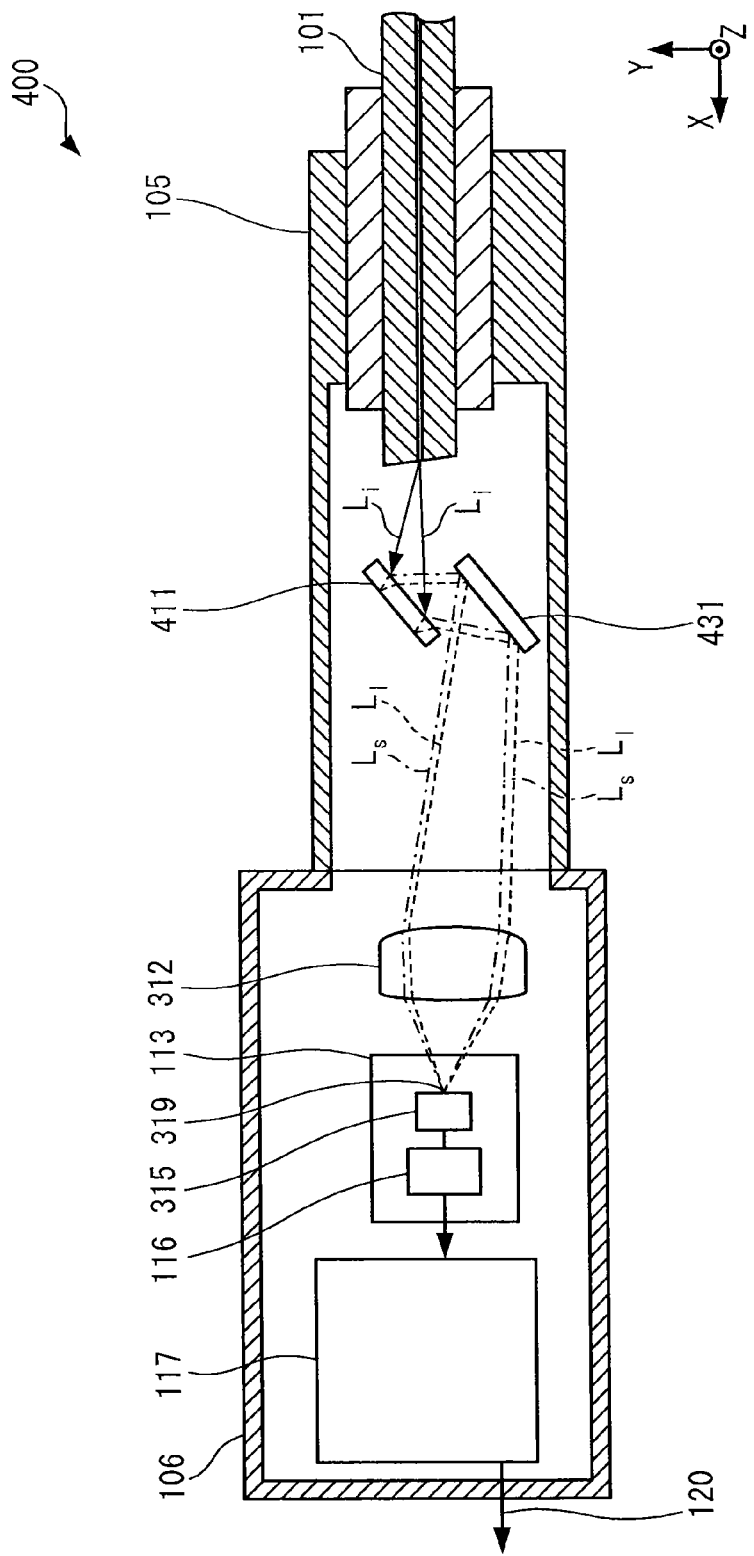
FIG. 5 is a cross-sectional drawing illustrating an optical receiver of a fourth embodiment of the present invention.

As illustrated in FIG. 5, the optical receiver 400 of this embodiment is provided with almost the same construction as the optical receiver 300 of embodiment 3; however, the locations of the optical filter 411 and mirror 431 in the optical holder 105 differ from those of the optical receiver 300 of embodiment 3.

The optical filter 411, as in the case of the optical filter 311 of embodiment 3, is a flat plate shaped wavelength separating filter that is fastened to the optical fiber holder 105 by way of a supporting member that is not illustrated in the figure. The front surface of the optical filter 411 reflects short-wavelength light $L_s$, and the rear surface reflects long-wavelength light $L_l$ and emits that light through the front surface.

The optical filter 411 differs from the optical filter 311 of embodiment 3 in that it is placed on the positive X-direction side with respect to the optical fiber 101 so that the short-wavelength light $L_s$ and long-wavelength light $L_l$ that are included in the incoming light $L_i$ that is emitted from the optical fiber 101 are reflected towards the mirror 431 that will be described later.

The mirror 431, as in the case of the mirror 331 of embodiment 3, is a flat surface mirror that is fastened to the optical fiber holder 105 by way of a support member that is not illustrated in the figure. The mirror 431 differs from the mirror 331 of embodiment 3 in that it is placed on the negative Y-direction side with respect to the optical filter 411, and is provided so as to reflect the short-wavelength light $L_s$ and long-wavelength light $L_l$ that are separated and reflected by the optical filter 411 towards the condensing lens 312.

Up to this point, the construction of the optical receiver 400 of this embodiment was explained. From this point, the operation of the optical receiver 400 will be explained.

The incoming light $L_i$ that enters inside the optical receiver 400 by being emitted from the end section of the optical fiber 101 is irradiated onto the optical filter 411. In the optical filter 411, the short-wavelength light $L_s$ is reflected using the front surface. The long-wavelength light $L_l$ passes through the front surface of the optical filter 411, is reflected using the rear surface, and emitted through the front surface.

The short-wavelength light $L_s$ and long-wavelength light $L_l$ that are separated and reflected by the optical filter 411 are reflected by the mirror 431 and enter into the condensing lens 312. The short-wavelength light $L_s$ and long-wavelength light $L_l$ pass through the condensing lens 312 and are condensed onto an area that is the same or smaller than the light-receiving region 319. In this way, the light-receiving region 319 is optically coupled with the end section of the optical fiber 101 by way of the optical filter 411, mirror 431 and condensing lens 312, in that order.

In this embodiment as well, chromatic aberration that occurs by light passing through the condensing lens 312 is corrected by the optical filter 411. Therefore, as in embodiment 1, it is possible to easily correct chromatic aberration, provide an inexpensive optical receiver 400, easily achieve an optical receiver 400 having good sensitivity that does not depend on the wavelength of light, and easily achieve an optical receiver 400 having high sensitivity to high-speed signals.

By providing the mirror 431, as in embodiment 3, it is possible to place the optical filter 411 inside the optical holder 105. As a result, it is possible to improve flexibility of design, for example, it is possible to make the optical receiver 400 more compact.

Particularly, in this embodiment, the optical filter 411 is placed at the very front of the optical path from where the incoming light $L_i$ enters into the optical receiver 400 towards the light-receiving region 319. Therefore, the incoming light $L_i$ that is emitted from the end section of the optical fiber 101 is irradiated onto the optical filter 411 before the light is widely diffused, or in other words in a state having a small diameter with a cross section that is perpendicular to the advancement direction of the light. As a result, it is possible to make the surface area of the front surface and the rear surface of the optical filter 411 small, and thus it is possible to reduce the cost of the optical filter. According to the embodiment, therefore, it becomes possible to make the optical receiver 400 more compact as well as to provide an inexpensive optical receiver 400.

Furthermore, the optical magnification M on the positive X-direction side of the condensing lens 312 as seen from the negative X-direction side is less than 1. Therefore, as in embodiment 1, it is possible to reduce dispersion in the image formation position that occurs because of the thickness of the optical filter 411 not being uniform due to manufacturing error. In other words, it is possible to obtain coupling efficiency having stable long-wavelength light $L_l$ regardless of where on the rear surface of the optical filter 411 that the long-wavelength light $L_l$ is reflected.

Embodiment 5

Figure 6:
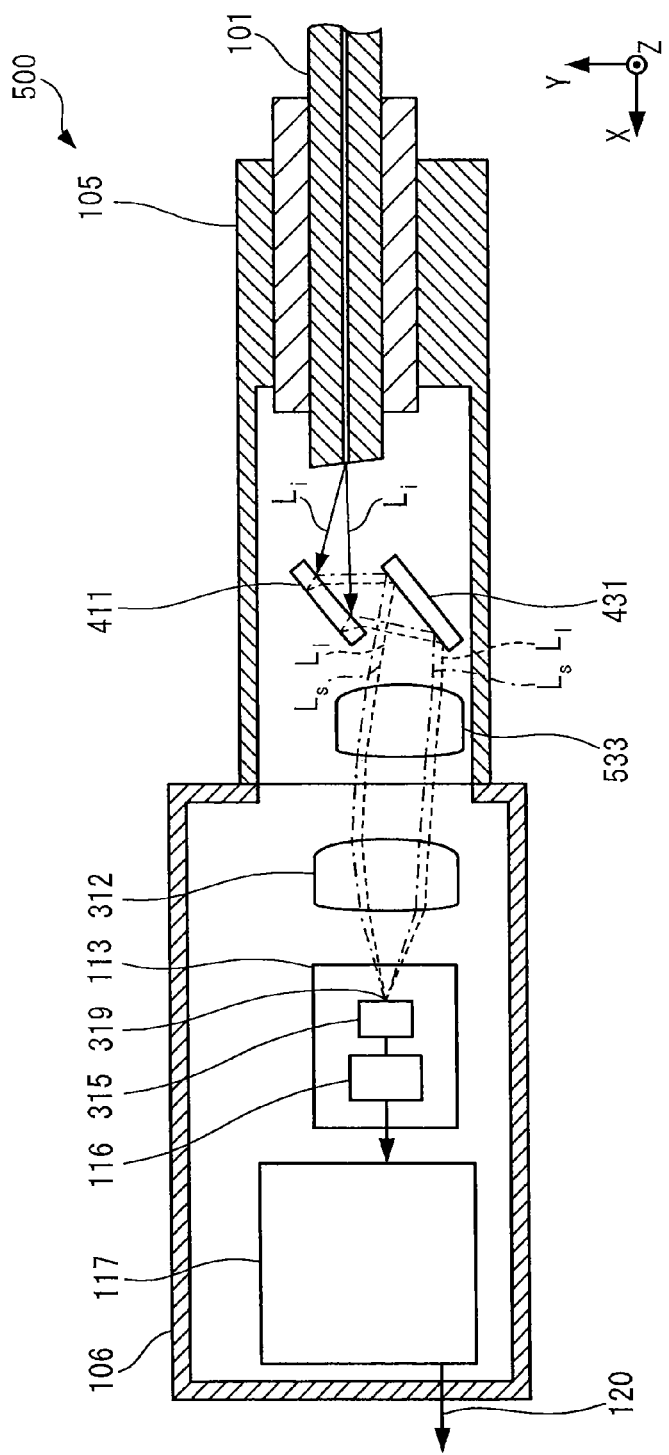
FIG. 6 is a cross-sectional drawing illustrating an optical receiver of a fifth embodiment of the present invention.

As illustrated in FIG. 6, the optical receiver 500 of this embodiment is provided with the same construction as the optical receiver 400 of embodiment 4; however, differs from the optical receiver 400 of embodiment 4 in that it also further contains a collimating lens 533.

The collimating lens 533 is a single convex lens that is fastened to the optical fiber holder 105 by way of a support member that is not illustrated in the figure. The collimating lens 533, for example, is located between the mirror 431 and the condensing lens 312, and converts the incoming light from the mirror 431 to collimated light or pseudo collimated light and emits that light to the condensing lens 312.

Up to this point, the construction of the optical receiver 500 of this embodiment has been explained. From this point on, the operation of the optical receiver 500 will be explained.

The incoming light $L_i$ that enters into the optical receiver 500 by being emitted from the end section of the optical fiber 101 is separated and reflected by the optical filter 411 as in embodiment 4, and then reflected by the mirror 431. The short-wavelength light $L_s$ and long-wavelength light $L_l$ that are reflected by the mirror 431 pass through the collimating lens 533 to become collimated light or pseudo collimated light and then enter the condensing lens 312.

The short-wavelength light $L_s$ and long-wavelength light $L_l$, as in embodiment 4, pass through the condensing lens 312 and are condensed onto a range that is the same or smaller than the size of the light-receiving region 319. In this way, the light-receiving region 319 is optically coupled with the end section of the optical fiber 101 by way of the optical filter 411, mirror 431, collimating lens 533 and condensing lens 312.

In this embodiment, chromatic aberration that occurs by light passing through the collimating lens 533 and condensing lens 312 is corrected by the optical filter 411. Therefore, as in embodiment 1, it is possible to easily correct chromatic aberration, provide an inexpensive optical receiver 500, easily achieve an optical receiver 500 having good sensitivity that does not depend on the wavelength of light, and easily achieve an optical receiver 500 that has high sensitivity to high-speed signals.

By providing a collimating lens 533 that emits collimated light or pseudo-collimated light near the end section of the optical fiber 101, it is possible to suppress a drop in coupling efficiency due to thermal expansion. Typically, the optical receiver 500 must be able to operate at high temperature and low temperature. When thermal expansion occurs, the distance between the end section of the optical fiber 101 that emits the incoming light $L_i$ and the condensing lens 312 for condensing light onto the light-receiving region 319 changes. Therefore, there is a drop in the coupling efficiency between the end section of the optical fiber 101 and the light-receiving region 319.

In this embodiment, the collimating lens 533 is fastened to the optical fiber holder 105. In other words, the collimating lens 533 is located near the end section of the optical fiber 101 in the optical path from where the incoming light $L_i$ enters into to the optical receiver 500 to the light-receiving region 319. Therefore, even though thermal expansion occurs, the change in the distance from the end section of the optical fiber 101 that emits the incoming light $L_i$ to the collimating lens 533 is relatively small, so that it is possible to suppress the effect on the coupling efficiency due to the change in this distance.

In this embodiment, the light that is emitted from the collimating lens 533 is collimated light or pseudo-collimated light. Therefore, the change in the distance between the collimating lens 533 and the condensing lens 312 due to thermal expansion hardly affects the coupling efficiency.

Therefore, by having the collimating lens 533 that emits collimated light or pseudo-collimated light located near the end section of the optical fiber 101, it is possible to suppress a drop in the coupling efficiency due to the change in the optical path length caused by thermal expansion.

Furthermore, the optical magnification M on the positive X-direction side of the collimating lens as seen from the negative X-direction side is less than 1. As a result, as in embodiment 1, it is possible to reduce the dispersion in the image formation position that occurs when the thickness of the optical filter 411 is not uniform due to manufacturing error. In other words, it is possible to obtain coupling efficiency with stable long-wavelength light $L_l$ regardless of where on the rear surface of the optical filter 411 that the long-wavelength light $L_l$ is reflected.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

The present invention is suitable for an optical receiver of an optical communication system, for example.

What is claimed is:

1. An optical receiver comprising:
    a photoelectric converter that outputs an electrical signal according to light received by a light-receiving region;
    a condensing lens that is located in an optical path from where signal light enters towards the light-receiving region, and that condenses the signal light onto the light-receiving region; and
    an optical filter that is located in the optical path from where the signal light enters towards the light-receiving region, and having a front surface that receives the signal light and a rearmost surface, the front surface that receives the signal light reflects light having a first wavelength that is included in the signal light and the rearmost surface reflects light having a second wavelength that is included in the signal light so that the light is emitted through the front surface.

2. The optical receiver according to claim 1, wherein the photoelectric converter has waveguide type construction.

3. The optical receiver according to claim 1, wherein the condensing lens has a magnification rate on the side towards the light-receiving region as seen from the side towards the incoming signal light that is less than 1.

4. The optical receiver according to claim 1, further comprising:
    an optical mirror that is located in the optical path from where the signal light enters towards the condensing lens; and wherein
    the optical filter is located in the optical path from where the signal light enters towards the condensing lens.

5. The optical receiver according to claim 4, wherein
    the optical filter is located in the optical path from where the signal light enters towards the optical mirror, and reflects the light having the first wavelength using the front surface and reflects the light having the second wavelength using the rearmost surface so that is emitted through the front surface;
    the optical mirror reflects the light having the first wavelength and the second wavelength that were reflected by the optical filter; and
    the condensing lens receives the light that was reflected by the optical mirror and condenses that light onto the light-receiving region.

6. The optical receiver according to claim 4, wherein
    the optical mirror is located in the optical path from where the signal light enters towards the optical filter, and reflects the incident signal light;
    the optical filter receives the signal light that was reflected by the optical mirror, and reflects the light having the first wavelength using the front surface and reflects the light having the second wavelength using the rearmost surface so that is emitted through the front surface; and
    the condensing lens receives the light that was reflected by the optical filter and condenses that light onto the light-receiving region.

7. The optical receiver according to claim 1, wherein
    the optical filter is located in the optical path from where the signal light passes through the condensing lens towards the light-receiving region, and the thickness of the optical filter from the front surface to the rearmost surface gradually changes so as to become thicker closer to the condensing lens.

8. The optical receiver according to claim 1, further comprising
a collimating lens that is located in the optical path from where the signal light enters towards the condensing lens, and that emits collimated light or pseudo collimated light.

9. The optical receiver according to claim 1, wherein:
the front surface and the rearmost surface of the optical filter are parallel to each other.

* * * * *